Aug. 10, 1943.  W. L. JOHNSON  2,326,363
MEASURING INSTRUMENT
Filed April 13, 1942
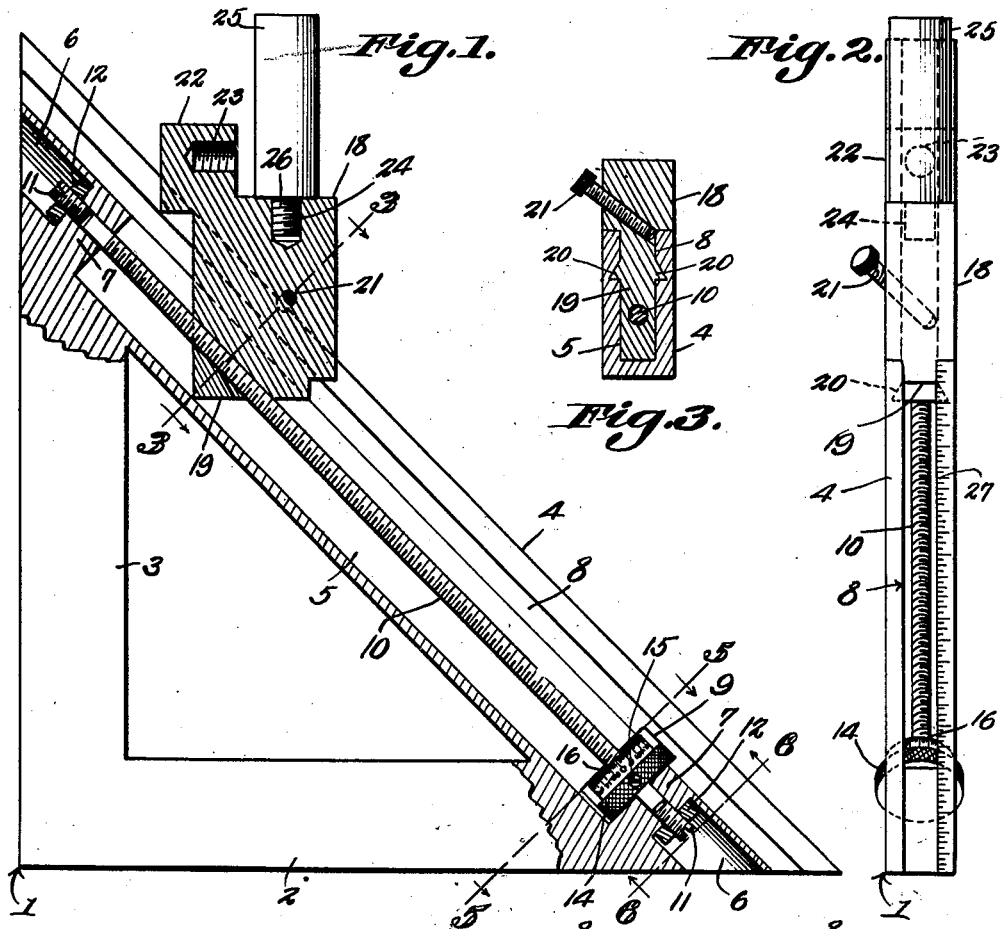
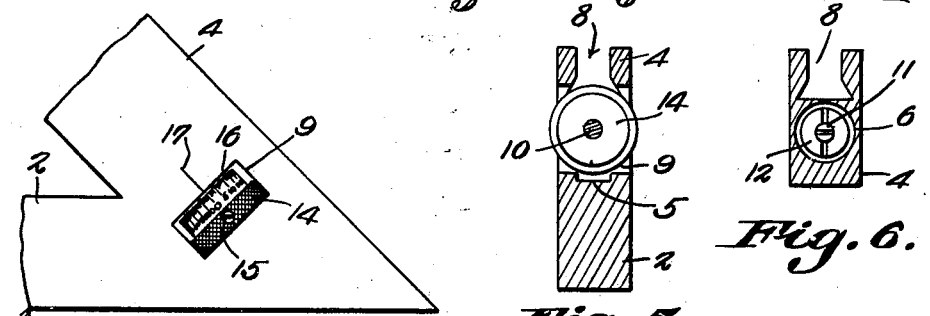
W. L. Johnson
INVENTOR.
BY Knowles Patented Aug. 10, 1943

2,326,363

UNITED STATES PATENT OFFICE 2,326,363

MEASURING INSTRUMENT

Walter L. Johnson, Bay City, Mich.

Application April 13, 1942, Serial No. 438,849

1 Claim. (Cl. 33—162)

This invention aims to provide a novel means for measuring vertical or horizontal distances, novel means being provided for mounting and moving a rider by which a reading can be taken.

A mechanic who abides by what is claimed may make changes in the precise structure shown, without departing from the invention.

In the drawing:

Fig. 1 shows in side elevation, an instrument constructed in accordance with the invention, parts being sectioned away;

Fig. 2 is an edge elevation;

Fig. 3 is a section on the line 3—3 of Fig. 1;

Fig. 4 is a fragmental side elevation showing parts that do not appear in Fig. 1;

Fig. 5 is a section on the line 5—5 of Fig. 1;

Fig. 6 is a section on the line 6—6 of Fig. 1.

In carrying out the invention, there is provided a body 1, made of any desired material, and in the form of an isosceles right triangle, including a base 2, an upright 3, and an inclined upper member 4. A longitudinal recess 5 is formed in the upper member 4, and there are bores 6 in the ends of the upper member, there being lugs 7 between the bores and the ends of the recess 5. In its upper edge, the member 4 has an under-cut guide groove 8, extended the full length of said member, and opening downwardly into the recess 5. Inwardly of the lowermost lug 7, the member 4 has an opening 9, extended entirely through the said member.

A micrometer screw 10 is journaled for rotation in the lugs 7 and has longitudinal adjustment therein. Adjusting screws 11 are threaded into the lugs 7 and extend into the bores 6, the inner ends of the screws 11 engaging the ends of the micrometer screw 10. Kerfed nuts 12 are threaded on the adjusting screws 11 and engage the lugs 7, to hold the screws 11 against rotation. A micrometer disk 14 is held by a set screw 15 on the micrometer screw 10 and is located in the opening 9. The micrometer disk 14 extends outwardly beyond the sides of the body 1, to promote a ready rotation of the disk. The micrometer disk 14 has circumferential graduations 16 of any desired kind. On one side, the member 4 has an index 17, adapted to cooperate with the graduations 16 of the micrometer disk 14. The set screw 15 can be loosened to adjust the disk 14 circumferentially. By means of the adjusting screws 11, the disk 14 can be so disposed in the opening 9 that it will not bind against the body 1 at the edges of the opening 9 which are at right angles to the micrometer screw 10.

A rider 18 is mounted for reciprocation on the upper, inclined edge of the body 1 and has a reduced foot 19 slidable in the groove 8 and extended downwardly into the recess 5, the foot having side ribs 20 received in the under-cut portions of the groove 8. The micrometer screw 10 is threaded through the foot 19 of the rider 18. A set screw 21 is threaded into the rider 18 and is adapted to bear against the member 4, to hold the rider in any position to which it may have been adjusted, longitudinally of the member 4.

The rider 18 is supplied at one end with an upstanding arm 22, in which a bore 23 is formed. The bore 23 is at right angles to the outer edge of the upright 3. In the upper end of the main part of the rider 18 there is a bore 24, disposed at right angles to the lower edge of the base 2. An elongated finger 25 is provided, and has at one end a screw 26 shaped to be threaded into the bore 24 or into the bore 23. The upper edge of the member 4 is supplied with a scale 27, of any desired sort. The instrument is adapted to be used in measuring either horizontal or vertical distances. Since the hypotenuse member 4 is longer than the altitude part 3 or the base 2, the scale 27 can be more finely graduated, and still be readable, than would be the case if it were on either of the parts 2 or 3. The micrometer disk 14 cooperates with the scale 27 in the usual way, and it will be seen that a very close reading can be obtained. The single scale 27 may be employed for giving either a vertical reading or a horizontal reading.

The rider 18 is moved along the upper edge of the part 4, by means of the screw 10 and a reading is taken on the scale 27 and on the graduations 16 of the micrometer disk 14. If a vertical distance is to be measured, between the lower edge of the base 2 and the upper end of the finger 25, then the screw 26 of the finger is mounted in the bore 24: but if a horizontal distance is to be measured, for instance between the outer edge of the upright 3 and the finger 25, then the screw 26 of the finger is mounted in the bore 23.

The instrument may be manipulated in many ways, to facilitate the work of a die maker or machinist or any person having use for a device of the class described.

Having thus described the invention, what is claimed is:

A measuring instrument comprising a body in the form of an isosceles right triangle, the body having a transverse opening and a longitudinal recess in its hypotenuse portion and having bores at the ends of the hypotenuse portion, the recess and the bores defining lugs, a micrometer screw journaled in the lugs and extended longitudinally of the recess, the hypotenuse portion having an edge groove which opens downwardly into the recess, a rider slidable along the outer edge of the hypotenuse portion and extended downwardly through the groove and into the recess, the micrometer screw being threaded into the rider, within the recess, the hypotenuse portion having a single longitudinal scale wherewith the rider cooperates, to give a unit reading, a micrometer disk located in the opening and secured to the micrometer screw and cooperating with the body to give a fractional reading, and screws threaded into the lugs and cooperating with the ends of the micrometer screw to hold it against longitudinal movement and prevent the micrometer disk from binding against the body along opposite edges of the opening, the outer ends of the lug screws being located in the bores.

WALTER L. JOHNSON.